United States Patent
Ishibashi

(10) Patent No.: US 11,933,730 B2
(45) Date of Patent: Mar. 19, 2024

(54) LIGHT SOURCE

(71) Applicant: Nippon Telegraph and Telephone Corporation, Tokyo (JP)

(72) Inventor: Shigeo Ishibashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 302 days.

(21) Appl. No.: 17/616,102

(22) PCT Filed: Jun. 6, 2019

(86) PCT No.: PCT/JP2019/022622
§ 371 (c)(1),
(2) Date: Dec. 2, 2021

(87) PCT Pub. No.: WO2020/245999
PCT Pub. Date: Dec. 10, 2020

(65) Prior Publication Data
US 2022/0317045 A1    Oct. 6, 2022

(51) Int. Cl.
*G01J 3/44*      (2006.01)
*G01N 21/65*     (2006.01)
(Continued)

(52) U.S. Cl.
CPC ............ *G01N 21/65* (2013.01); *G02B 21/06* (2013.01); *H01S 3/302* (2013.01)

(58) Field of Classification Search
CPC ............ G01N 21/65; G01N 2021/653; G01N 2201/06113; G01J 3/44; G02B 21/06;
(Continued)

(56) References Cited

U.S. PATENT DOCUMENTS 5,377,219 A * 12/1994 Geiger ............ G02F 1/39
                                                    372/20
2014/0247448 A1* 9/2014 Wise .............. H01S 3/1083
                                                    359/330
(Continued)

FOREIGN PATENT DOCUMENTS

JP    2012-112863 A    6/2012
JP    2015-158482 A    9/2015

OTHER PUBLICATIONS

Yasuyuki Ozeki et al., *Label-Free Biological Imaging Based on Stimulated Raman Scattering Microscopy*, Laser Research, vol. 39, No. 12, 2011, pp. 887-892.
(Continued)

*Primary Examiner* — Abdullahi Nur
(74) *Attorney, Agent, or Firm* — Workman Nydegger

(57) ABSTRACT

A light source employed in a coherent Raman scattering (CRS) spectroscopic apparatus or a CRS microscope includes a chromium forsterite laser (CrFL), a variable delay optical path configured to delay one optical pulse of branched optical pulses obtained by dividing an optical pulse from the CrFL according to a power, a highly nonlinear waveguide into which the other optical pulse of the branched optical pulses is input, a first wavelength filter connected to an output of the highly nonlinear waveguide, an ytterbium-doped glass fiber optical amplifier (YbFA) connected to an output of the wavelength filter, and a second wavelength filter connected to an output of the YbFA. The light source includes a one-optical path mode in which two wavelength bands corresponding to Raman scattering wavenumbers to be used for measurement are selected from an output of the variable delay optical path, and a two-optical path mode in which an output of the variable delay optical
(Continued)

path and an output of the second wavelength filter are time-synchronized.

11 Claims, 2 Drawing Sheets

(51) Int. Cl.
  *G02B 21/06* (2006.01)
  *H01S 3/30* (2006.01)
(58) Field of Classification Search
  CPC .... H01S 3/302; H01S 3/06754; H01S 3/0078; H01S 3/0092; H01S 3/1618; H01S 2301/08
  See application file for complete search history.

(56) References Cited

U.S. PATENT DOCUMENTS

| | | |
|---|---|---|
| 2015/0204790 A1 | 7/2015 | Yonetani |
| 2016/0080206 A1 | 3/2016 | Prakash et al. |

OTHER PUBLICATIONS

Yasuyuki Ozeki et al., *High-speed Molecular Spectral Imaging of Tissue with Stimulated Raman Scattering*, Nature Photonics, vol. 6, 2012, pp. 845-851.

Dario Polli et al., *Broadband Coherent Raman Scattering Microscopy*, Laser & Photonics Reviews, vol. 12, No. 9, 2018, pp. 1-36.

Kazuhiko Misawa, *Toward the Medical Application of Non-Labeled Spectroscopic Imaging Using Ultrashort Pulse Laser Technology*, Applied Physics, vol. 88, No. 1, 2019, pp. 19-25.

Benjamin Figueroa et al., *Broadband Hyperspectral Stimulated Raman Scattering Microscopy with a Parabolic Fiber Amplifier Source*, Biomedical Optics Express, vol. 9, No. 12, 2018, pp. 6116-6131.

Masahiko Kawagishi et al., *Direct Label-Free Measurement of the Distribution of Small Molecular Weight Compound Inside Thick Biological Tissue Using Coherent Raman Microspectroscopy*, Scientific Reports, Sep. 10, 2015, pp. 1-10.

Demirhan Kobat et al., *Deep Tissue Multiphoton Microscopy Using Longer Wavelength Excitation*, Optics Express, vol. 17, No. 16, 2009, pp. 13354-13364.

Zhigang Zhang et al., *Broadband Semiconductor Saturable-Absorber Mirror for a Self-Starting Mode-Locked Cr:Forsterite Laser*, Optics Letters, vol. 23, No. 18, 1998, pp. 1465-1467.

Terumasa Ito et al., *Single-Beam Phase-Modulated Stimulated Raman Scattering Microscopy with Spectrally Focused Detection*, Journal of the Optical Society of America B, vol. 34, No. 5, 2017, pp. 1004-1015.

Karl A. Tillman et al., *Stabilization of a Self-Referenced, Prism-Based, Cr:Forsterite Laser Frequency Comb Using an Intracavity Prism*, Applied Optics, vol. 48, No. 36, 2009, pp. 6980-6989.

Huanyu Song et al., *Practical 24-fs, 1-µj, 1-MHz Yb-Fiber Laser Amplification System*, Optics Express, vol. 25, No. 7, 2017, pp. 7559-7566.

\* cited by examiner

LIGHT SOURCE

TECHNICAL FIELD

The present invention relates to a light source employed in a coherent Raman scattering (CRS) spectroscopic apparatus or a CRS microscope.

BACKGROUND ART

Raman scattering spectroscopy is widely employed in many academic fields including chemistry, biology, medicine, pharmacy, agriculture, and physics and also in medical care and industrial fields as a means of obtaining vibration pattern information of molecules, crystals, amorphous structures, and the like. Spontaneous Raman scattering is a phenomenon in which scattered light having a frequency shifted by a frequency of a molecular vibration pattern or a lattice vibration pattern due to incident light having a high intensity is generated. The intensity of the scattered light is very weak with respect to the original incident light, and thus, it takes a long time to obtain spectral information with a high SN-ratio from the scattered light. On the other hand, coherent Raman scattering (CRS) such as stimulated Raman scattering (SRS) and coherent anti-Stokes Raman scattering (CARS) has very strong scattering intensity, which enables measurement in a short time. With the development of lasers used as light sources, CRS measurements have been developed remarkably. In particular, this effect is remarkable when a microscope image of Raman scattered light is to be obtained. In biology, medicine, and pharmacy, a large number of methods utilizing CRS microscopes have been proposed, and further development therefor is desired (see, for example, NPLs 1 and 2).

When living organisms are to be measured by Raman scattering spectroscopy, there are two important wavenumber regions. The two wavenumber regions include a region with a wavenumber of 500-1800 $cm^{-1}$ called a fingerprint region, and a region with a wavenumber of 2700-3100 $cm^{-1}$ resulting from carbon-hydrogen (C—H) bonds, nitrogen-hydrogen (N—H) bonds, or oxygen-hydrogen (O—H) bonds (see, for example, NPLs 1, 3, and 4). In CRS, the target to be measured is irradiated with light of two wavelengths having a wavenumber difference corresponding to the wavenumbers in the two regions mentioned above.

A titanium sapphire laser (TiSL), an optical parametric oscillator (OPO), an erbium-doped glass fiber laser (ErFL), an ytterbium-doped glass fiber laser (YbFL), or the like is employed for light sources of CRS microscopes. The generation efficiency of CRS increases as the intensity of the electric field of light is high, and thus, pulsed oscillation lasers having a time width of about 15 fs to 10 ns are often employed. Here, a wavenumber band is defined as a band in which the light intensity is $\frac{1}{10}$ or greater of the peak. When an OPO, ErFL, YbFL, or the like is used in pulsed oscillation, the wavenumber band of the oscillating light has a maximum wavenumber of 900 $cm^{-1}$ (see, for example, NPL 12). This wavenumber band is narrower than the band of the fingerprint region mentioned above, and in order to measure the entire fingerprint region, it is necessary to sweep an oscillation wavelength (wavenumber). The sweep width of a fiber laser is about 300 $cm^{-1}$, which is insufficient for measuring the entire fingerprint region even if the oscillation wavelength (wavenumber) is swept (see, for example, NPL 2). The OPO has a sweep band that is sufficient for measuring the entire wavenumber band in the fingerprint region, but requires several seconds for wavelength switching and is not suitable for high-speed measurements (see, for example, NPL 5).

FIG. 1 illustrates a configuration of a CRS microscope using a known titanium sapphire laser. In the CRS microscope, a TiSL 101 and a CRS measurement unit 102 are coupled via a spatial optical path 103. The TiSL 101 can perform pulsed oscillation having a sufficient wavenumber band. The TiSL described in NPL 6 emits pulsed light having a center wavelength of 800 nm, a time width of 15 fs, and a wavelength band of 100 nm or greater.

FIG. 2 shows an output wavelength band of the laser. As indicated by A in FIG. 2, the pulsed light of the TiSL has a band of about 1500 $cm^{-1}$ or greater in terms of wavenumbers, and can cover a large part of the fingerprint region (see, for example, NPLs 4 and 6).

However, light of the TiSL having the oscillation center wavelength of around 800 nm is strongly scattered due to a nonuniform structure when a living tissue is irradiated. Thus, the light has the penetrability lower than light having a wavelength of 1050-1400 nm (B in FIG. 2) or 1500-1850 nm (C in FIG. 2), and has the intensity insufficient for CRS measurement in deep parts of the living tissue (see, for example, NPL 7). It has been confirmed that the penetrability is low in a two-photon fluorescence spectroscopy, which is a nonlinear spectroscopic method similar to CRS. It has been reported that, when the TiSL is employed, observation is only possible at a maximum depth of about 500 µm, whereas when a light source having a center wavelength of 1280 nm is employed, observation is possible even at a depth exceeding 1000 µm (see, for example, NPL 8). The same applies to CRS, and when measurement light having a wavelength of around 800 nm is employed, there is a problem in that the depth of penetration into the living tissue is insufficient.

CITATION LIST

Non Patent Literature

NPL 1: Yasuyuki OZEKI, Kazuyoshi ITOH, "Label-Free Biological Imaging Based on Stimulated Raman Scattering Microscopy", Laser Review Vol. 39, No. 12, pp. 887-892 (2011)

NPL 2: Ozeki, Yasuyuki, et al. "High-speed Molecular Spectral Imaging of Tissue with Stimulated Raman Scattering." Nature photonics 6.12 (2012): 845.

NPL 3: Polli, D., Kumar, V., Valensise, C. M., Marangoni, M., & Cerullo, G., "Broadband Coherent Raman Scattering Microscopy," Laser & Photonics Reviews, 12(9), 1800020, (2018)

NPL 4: Misawa Kazuhiko, "Application of Label-free Spectroscopic Imaging Using Ultrashort Pulse Laser Technology to the Medical Field", Applied Physics Vol. 88, No. 1, pp. 19-25 (2019)

NPL 5: Figueroa, B., Fu, W., Nguyen, T., Shin, K., Manifold, B., Wise, F., & Fu, D., "Broadband Hyperspectral Stimulated Raman Scattering Microscopy with a Parabolic Fiber Amplifier Source," Biomedical Optics Express, 9(12), 6116-6131 (2018)

NPL 6: Kawagishi, M., Obara, Y., Suzuki, T., Hayashi, M., Misawa, K., & Terada, S., "Direct Label-free Measurement of the Distribution of Small Molecular Weight Compound Inside Thick Biological Tissue Using Coherent Raman Microspectroscopy, "Scientific reports, 5, 138 68 (2015)

NPL 7: Wang, K., Horton, N. G., Charan, K., & Xu, C, "Advanced Fiber Soliton Sources for Nonlinear Deep Tissue Imaging in Biophotonics," IEEE Journal of Selected Topics in Quantum Electronics, 20(2), 50-60 (2014)

NPL 8: Kobat, D., Durst, M. E., Nishimura, N., Wong, A. W., Schaffer, C. B., & Xu, C., "Deep Tissue Multiphoton Microscopy using Longer Wavelength Excitation," Optics express, 17(16), 13354-13364 (2009)

NPL 9: Zhigang Zhang, Kenji Torizuka, Taro Itatani, Katsuyuki Kobayashi, Takeyoshi Sugaya, Tadashi Nakagawa, and Hiroshi Takahashi, "Broadband Semiconductor Saturable-absorber Mirror for a Self-starting Mode-locked Cr:forsterite laser," Opt. Lett. 23, 1465-1467 (1998)

NPL 10: Terumasa Ito, Yuki Obara, and Kazuhiko Misawa, "Single-beam Phase-modulated Stimulated Raman Scattering Microscopy with Spectrally Focused Detection," J. Opt. Soc. Am. B34, 1004-1015 (2017)

NPL 11: Karl A. Tillman, Rajesh Thapa, Kevin Knabe, Shun Wu, Jinkang Lim, Brian R. Washburn, and Kristan L. Corwin, "Stabilization of a Self-referenced, Prism-based, Cr: Forsterite Laser Frequency Comb Using an Intracavity Prism," Appl. Opt. 48, 6980-6989 (2009)

NPL 12: Huanyu Song, Bowen Liu, Yang Li, Youjian Song, Hao He, Lu Chai, Minglie Hu, and Chingyue Wang, "Practical 24-fs, 1-µJ, 1-MHz Yb-fiber Laser Amplification System," Opt. Express 25, 7559-7566 (2017)

SUMMARY OF THE INVENTION

An object of the present invention is to provide a light source emitting measurement light, with a wavelength of 1050-1400 nm or 1500-1850 nm, having a penetrability with respect to living tissues than oscillating light of a TiSL having a center wavelength of 800 nm, and being usable in CRS measurements of the entire wavenumber band in a fingerprint region, without sweeping the oscillation wavelength.

In order to achieve such an object, one embodiment of the present invention is a light source employed in a coherent Raman scattering (CRS) spectroscopic apparatus or a CRS microscope. The light source includes a chromium forsterite laser (CrFL), a variable delay optical path that delays one optical pulse of branched optical pulses obtained by dividing an optical pulse from the CrFL according to a power, a highly nonlinear waveguide into which the other optical pulse of the branched optical pulses of the optical pulse from the CrFL is input, a first wavelength filter connected to an output of the highly nonlinear waveguide and an ytterbium-doped glass fiber optical amplifier (YbFA) connected to an output of the first wavelength filter, and a second wavelength filter connected to an output of the YbFA. The light source includes a one-optical path mode in which two wavelength bands corresponding to a Raman scattering wavenumber to be used for measurement are selected from an output of the variable delay optical path, and a two-optical path mode in which an output of the variable delay optical path and an output of the second wavelength filter are time-synchronized so that two wavelength bands corresponding to a Raman scattering wavenumber to be used for measurement are selected from the output of the variable delay optical path and the output of the second wavelength filter that are time-synchronized.

$v_1 \geq v_0 - (M-W_1)/2$ and $v_2 \leq v_0 - M - W_2/2$ are satisfied where the CrFL outputs an optical pulse including a band having a maximum wavenumber $v_1$ and a minimum wavenumber $v_2$, $v_0$ denotes a center wavenumber of the optical pulse amplified by the YbFA, M denotes a maximum wavenumber of Raman scattering to be used for measurement, $W_1$ denotes each of the two wavelength bands in the one-optical path mode, and $W_2$ denotes each of the two wavelength bands in the two-optical path mode.

DESCRIPTION OF EMBODIMENTS

Hereinafter, embodiments of the present disclosure will be described in detail with reference to the drawings.

Figure 1:
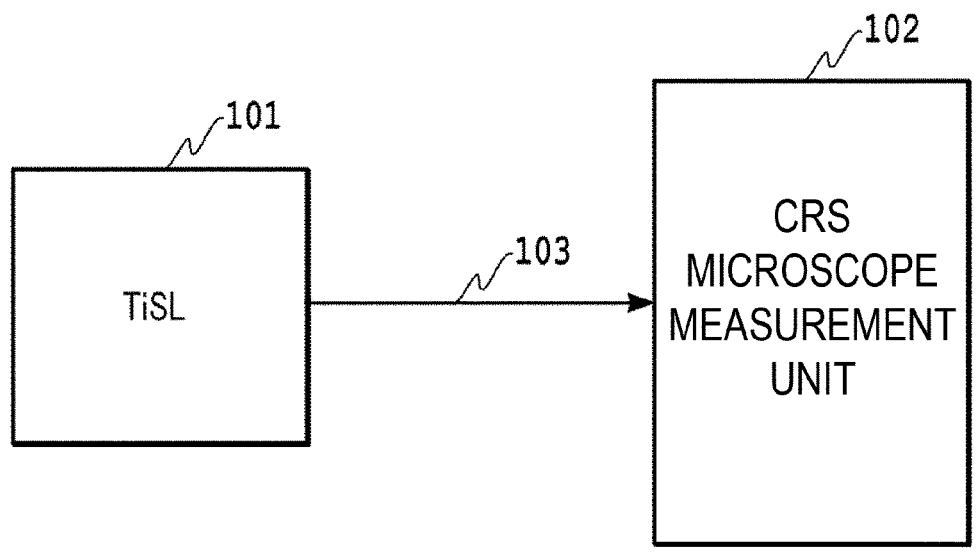
FIG. 1 is a diagram illustrating a configuration of a CRS microscope using a known titanium sapphire laser.
Figure 2:
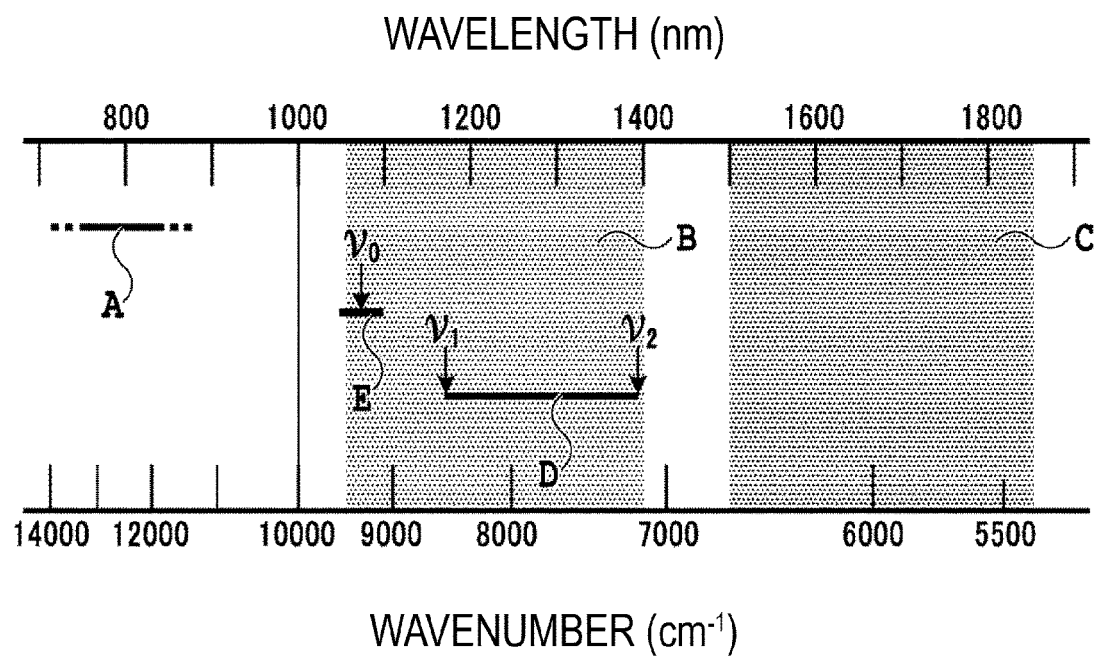
FIG. 2 is a diagram showing an output wavelength band of the laser.

In the present embodiment, a CRS microscope includes a light source obtained by combining a chromium forsterite laser (CrFL) and an ytterbium-doped glass fiber laser (YbFL). The CrFL emits a pulse having a center wavelength of 1290 nm, a time width of 20 fs, and a wavelength band of 150 nm (see, for example, NPL 9). The oscillation wavelength band of this CrFL exceeds 1400 nm and light in this wavelength band from this CrFL is highly absorbed by living tissues not to be used for CRS measurements in deep parts of living bodies. Consequently, only the CrFL having wavenumbers of about 1400 cm$^{-1}$ corresponding to a wavelength band of 1170-1400 nm indicated by D in FIG. 2 is used for measurement.

Here, in an example of a CRS microscope, a stimulated Raman scattering microscope is described (see, for example, NPL 10). From among pulsed light emitted by the TiSL having a center wavelength of 800 nm, a time width of 15 fs, and a wavelength band of 100 nm or greater, for example, light having a center wavelength of 780 nm and a wavelength band of 10 nm (defined as pump light), and light having a center wavelength of 860 nm and a wavelength band of 10 nm (defined as Stokes light) are extracted. When a target to be measured is simultaneously irradiated with the pump light and the Stokes light, a signal from stimulated Raman scattering is obtained. A band of 10 nm is about 150 cm$^{-1}$ in terms of wavenumbers.

When the CrFL is used in the configuration of a stimulated Raman scattering microscope, a band measurable in Raman scattering is up to about 1250 cm$^{-1}$ obtained by subtracting about 150 cm$^{-1}$ from the wavenumber of about 1400 cm$^{-1}$ mentioned above. Consequently, it is not possible to measure the entire fingerprint region by using only the CrFL. Thus, a light source usable for measuring the entire fingerprint region includes a one-optical path mode in which only an optical pulse from the CrFL is employed, and a two-optical path mode in which super continuum (SC) light from light emitted by the CrFL is generated, a part of the wavelength band is selected and amplified by a YbFA, and optical pulses in the two systems are synchronized and output.

Figure 3:
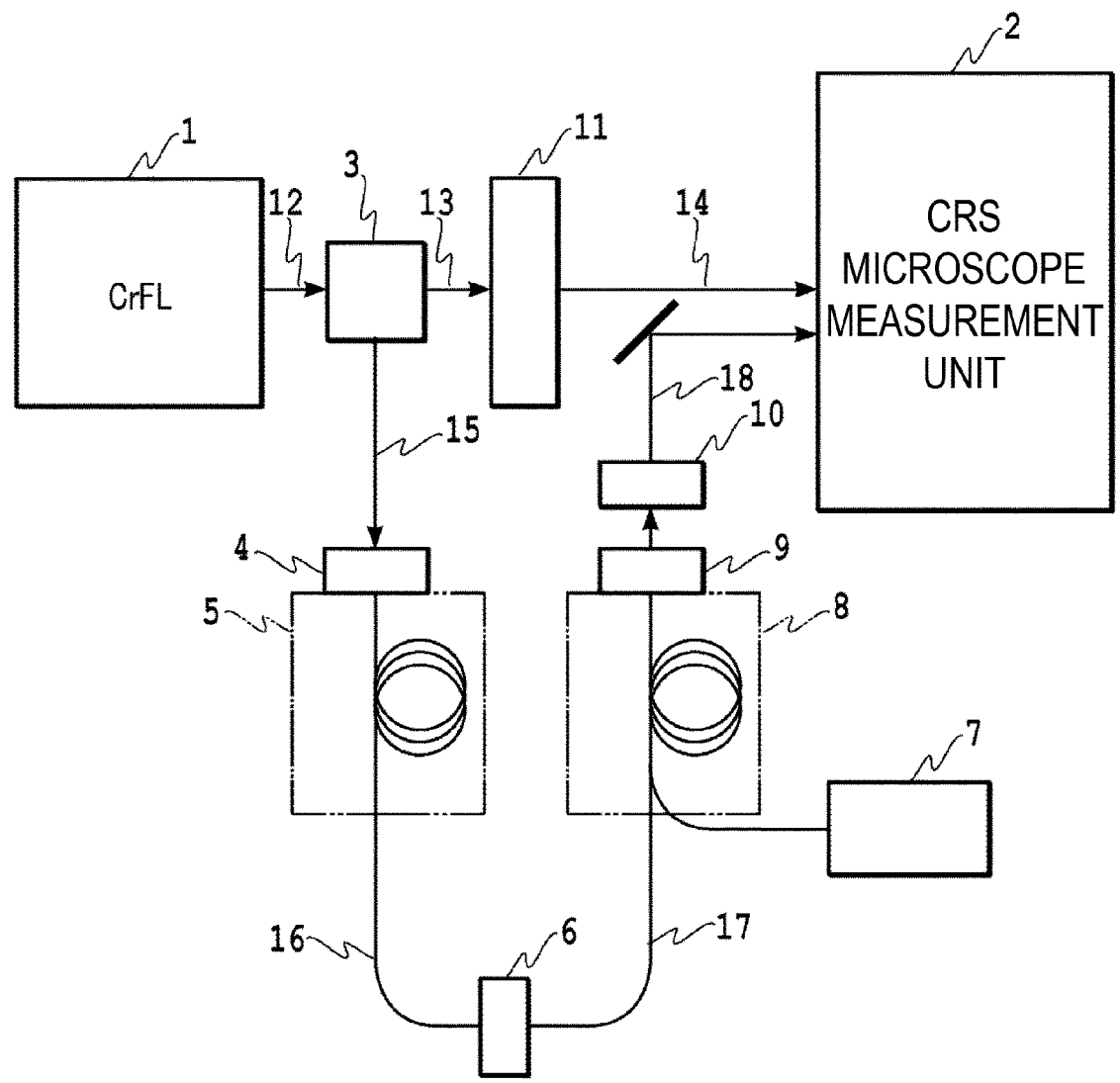
FIG. 3 is a diagram illustrating a configuration of a CRS microscope according to an embodiment of the present invention.

FIG. 3 illustrates a configuration of a CRS microscope according to an embodiment of the present invention. A CrFL 1 is coupled to an optical path adjuster 3 via a spatial optical path 12. The optical path adjuster 3 divides an optical pulse emitted from the CrFL 1 according to the power to branch the optical pulse into two systems, and outputs one of the branched optical pulses to a variable delay optical path 11 via a spatial optical path 13. The variable delay optical path 11 delays the optical pulse and outputs the optical pulse to a CRS microscope measurement unit 2 via a spatial optical path 14. The other one of the branched optical pulses enters a highly nonlinear fiber 5 from a spatial optical fiber coupling optical system 4, via a spatial optical path 15. An output of the highly nonlinear fiber 5 is connected to a YbFL via an optical fiber 16, a wavelength filter 6, and an optical fiber 17. The YbFL includes an excitation semiconductor laser 7, an ytterbium-doped glass fiber optical amplifier (YbFA) 8, and an optical fiber spatial coupling optical system 9, and an output of the YbFL enters the CRS microscope measurement unit 2 via a wavelength filter 10 and a spatial optical path 18.

One-Optical Path Mode

For measurements using a wavenumber of up to about 1250 cm$^{-1}$, only an optical pulse from the CrFL is used. An optical pulse emitted from the CrFL 1 passes the spatial optical path 12 and is input into the optical path adjuster 3. In the one-optical path mode, the optical pulse passes the spatial optical path 13 without any change, also passes the spatial optical path 14 without undergoing any change in the variable delay optical path 11, and enters the CRS microscope measurement unit 2. In the CRS microscope measurement unit 2, two wavelength bands corresponding to a Raman scattering wavenumber to be used for measurement are selected from the incident optical pulse and a target to be measured is simultaneously irradiated with an optical pulse of the two selected wavelength bands by the microscope. Thus, a CRS signal having a wavenumber of from 500 cm$^{-1}$ to 1250 cm$^{-1}$ is generated.

Two-Optical Path Mode

In a case of a measurement using a wavenumber greater than about 1250 cm$^{-1}$, both an optical pulse from the CrFL that passes the variable delay optical path 11 and an optical pulse emitted from the YbFL are simultaneously used. The optical pulse emitted from the CrFL 1 passes the spatial optical path 12 and is divided into two systems by the optical path adjuster 3. The optical path adjuster 3 includes a half-wave plate and a polarization beam splitter. Alternatively, a 45° semi-transmissive mirror may be employed to switch mechanically. A system 1 refers to an optical path leading to the spatial optical path 13, and a system 2 refers to an optical path in which an optical pulse is reflected and directed to the spatial optical path 15, respectively.

The optical pulse in the system 2 is input into the highly nonlinear fiber 5 by the spatial optical fiber coupling optical system 4 using an aspherical lens. An objective lens may be employed instead of the aspherical lens. The highly nonlinear fiber 5 is a germanium-doped silica glass dispersion shift fiber having a dispersion constant of D=1.19 ps/(nm*km) at a wavelength of 1550 nm (see, for example, NPL 11). In the highly nonlinear fiber 5, an effective cross-sectional area of the core is 13.9 μm$^2$ and the length is 2 m.

When an optical pulse emitted from the CrFL 1 having a time width of several tens of fs enters the highly nonlinear fiber 5, SC light is emitted. The SC light expands over wavelengths of from 1000 nm to 2300 nm, and is generally a combination of two Gaussian function-type spectra. The first Gaussian function-type spectrum has a peak wavelength of 1150 nm and a full width at half maximum of 220 nm, and the second Gaussian function-type spectrum has a peak wavelength of 2090 nm and a full width at half maximum of 110 nm. The power per unit wavelength in the peak of the second Gaussian function-type spectrum is about half the value in the peak of the first Gaussian function-type spectrum.

Next, only light of a wavelength band having a wavelength width of 6.5 nm and being centered around 1040 nm, is selected from the SC light passing through the optical fiber 16, by the wavelength filter 6, and enters the optical fiber 17. The wavelength filter 6 is a wavelength filter having a multilayer dielectric film. The power of the light passing the wavelength filter 6 is about 1/100 of the total power of the SC light in the spectrum described above.

If light having a center wavelength of 1040 nm from the optical fiber 17 enters the YbFA 8, it is possible to perform similariton pulse (parabolic pulse) amplification (see, for example, NPL 5). When continuous oscillating light having a wavelength of 976 nm and an output power of 7 W is input from the excitation semiconductor laser 7, a positive chirped pulse having a wavelength extending from 1020 nm to 1100 nm is obtained. After the positive chirped pulse is transformed into spatial light in the optical fiber spatial coupling optical system 9, only a wavelength band having a wavelength of 1050 nm or greater (E indicated in FIG. 2) is selected by the wavelength filter 10 and light in this wavelength band enters the CRS microscope measurement unit 2 from the spatial optical path 18.

The amount of delay of the optical pulse in the system 1 is adjusted by the variable delay optical path 11 so that the optical pulse in the system 1 is time-synchronized with the optical pulse in the system 2 and the pulses in the two systems simultaneously enter the CRS microscope measurement unit 2. In the CRS microscope measurement unit 2, a part of the wavenumber region of the optical pulse in the system 1 is selected. A method of selecting the wavelength from the optical pulse in the system 1 may include using a wavelength filter, or changing a synchronization timing with the pulse in the system 2 after a positive chirp is added to the optical pulse in the system 1. Light in two wavelength bands corresponding to Raman scattering wavenumbers to be used for measurement is time-synchronized with the pulses selected from each of the system 1 and the system 2, and a target to be measured is irradiated with the light obtained after the synchronization by the microscope. A maximum value of a difference in wavenumber between the two pulses is adjusted to be 1800 cm$^{-1}$. A minimum value of the difference in wavenumber between the two pulses may be less than 1250 cm$^{-1}$. In the two-optical path mode, it is possible to measure the target in a wavenumber range from 800 cm$^{-1}$ to 1800 cm$^{-1}$. Consequently, if CRS spectra obtained from the one-optical path mode and the two-optical path mode are combined, it is possible to measure the target in a wavenumber range from 500 cm$^{-1}$ to 1800 cm$^{-1}$, and thus, to measure the entire fingerprint region.

Some targets to be measured have a small water content and the wavelength dependence of the light penetrability is slightly different from that of many living tissues, and thus, a wavelength band having a wavelength of 1400 nm or greater may be used for a pulse in the one-optical path mode and a pulse in the system 1 of the two-optical path mode with no objection (see, for example, NPL 7). Furthermore, a wavelength band of 1050 nm or less may be used for a pulse in the system 2 of the two-optical path mode with no objection.

Measurement Conditions

To realize a measurement of the entire fingerprint region, the Raman scattering spectra in the two modes need to be continuously measured. The conditions are described below. It is assumed that in the pulse in the one-optical path mode and the pulse in the system 1 of the two-optical path mode, the oscillating light from the CrFL has a maximum wavenumber of $v_1$ and a minimum wavenumber of $v_2$. It is assumed that a center wavenumber of the pulse in the system 2 of the two-optical path mode is $v_0$. If the maximum wavenumber at which to perform Raman scattering measurement is M, and the wavenumber bands of the pump light and the Stokes light are $W_1$ for the one-optical path mode and $W_2$ for the two-optical path mode (unit: $cm^{-1}$), the following two expressions:

$$v_0-(v_1-W_2/2) \leq v_1-v_2-W_1;\ \text{and}$$

$$v_0-(v_2+W_2/2) \geq M$$

need to be satisfied simultaneously. These expressions are transformed to obtain the following two expressions.

$$v_1 \geq v_0-(M-W)/2$$

$$v_2 \leq v_0-M-W_2/2$$

For example, in a case of M: 1800, $W_1$: 150, $W_2$: 300, $v_0$: 9350 (wavelength 1.07 μm), $v_1 \geq 8520$ and $v_2 \leq 7400$ are obtained by the calculation. The wavenumber 8520 $cm^{-1}$ corresponds to a wavelength of 1.17 μm and the wavenumber 7400 $cm^{-1}$ corresponds to a wavelength of 1.35 μm.

According to the light source of the present embodiment, measurement light having a penetrability with respect to living tissues and having a wavelength of 1050-1400 nm or 1500-1850 nm is used, and thus, it is possible to perform CRS spectroscopic measurements or CRS microscope measurements in the entire region having a wavenumber of 500-1800 $cm^{-1}$, referred to as the fingerprint region.

OTHER EXAMPLES

A single crystal bulk rod is usually employed for a amplification medium in the CrFL, but a single crystal fiber can also be employed. For example, referring to NPL 9, a chromium forsterite single crystal bulk rod having a diameter of 3 mm and a length of 7 mm is used, and the temperature of a fixing tool is maintained at 2° C. during use. The single crystal fiber has a diameter of 120 μm or less, is thinner than the bulk rod, and has excellent cooling properties, and thus, the temperature of the fixing tool may be close to an ordinary temperature. Thus, it is possible to shorten the preparation time before starting use, reduce the power consumption, and improve the stability of the oscillation. Furthermore, an ordinary CrFL is excited by a solid-state laser (including a glass fiber laser), and when a single crystal fiber is employed, the single crystal fiber can be directly excited by a semiconductor laser, and thus, it is possible to reduce the apparatus cost.

To generate SC light, a highly nonlinear fiber (germanium-doped silica glass dispersion shift fiber) is employed, but the SC light can also be generated by using other highly nonlinear waveguide media such as photonic crystal fibers, chalcogenide fibers, and planar optical circuits.

In the configuration described above, the one-optical path mode and the two-optical path mode are switched. However, if the output power of the CrFL is sufficiently high, the light source always may operate in the two-optical path mode and switch only the operation of the CRS microscope measurement unit as necessary to acquire a continuous Raman scattering spectrum.

Furthermore, in the same configuration, a CRS spectroscopic apparatus may be employed instead of the CRS microscope.

The invention claimed is:

1. A light source employed in a coherent Raman scattering (CRS) spectroscopic apparatus or a CRS microscope, the light source comprising:
    a chromium forsterite laser (CrFL);
    a variable delay optical path configured to delay one optical pulse of branched optical pulses obtained by dividing an optical pulse from the CrFL according to a power;
    a highly nonlinear waveguide into which the other optical pulse of the branched optical pulses of the optical pulse from the CrFL is input;
    a first wavelength filter connected to an output of the highly nonlinear waveguide;
    an ytterbium-doped glass fiber optical amplifier (YbFA) connected to an output of the first wavelength filter; and
    a second wavelength filter connected to an output of the YbFA,
    wherein the light source includes a one-optical path mode in which two wavelength bands corresponding to a Raman scattering wavenumber to be used for measurement are selected from an output of the variable delay optical path, and a two-optical path mode in which an output of the variable delay optical path and an output of the second wavelength filter are time-synchronized so that two wavelength bands corresponding to a Raman scattering wavenumber to be used for measurement are selected from the output of the variable delay optical path and the output of the second wavelength filter that are time-synchronized.

2. The light source according to claim 1, wherein $$v_1 \geq v_0-(M-W_1)/2\ \text{and}$$

$$v_2 \leq v_0-M-W_2/2$$

are satisfied
where the CrFL outputs an optical pulse including a band having a maximum wavenumber $v_1$ and a minimum wavenumber $v_2$, $v_0$ denotes a center wavenumber of the optical pulse amplified by the YbFA, M denotes a maximum wavenumber of Raman scattering to be used for measurement, $W_1$ denotes each of the two wavelength bands in the one-optical path mode, and $W_2$ denotes each of the two wavelength bands in the two-optical path mode.

3. The light source according to claim 1, further comprising an optical path adjuster configured to divide an optical pulse between the one-optical path mode in which an optical pulse from the CrFL is output to the variable delay optical path, and the two-optical path mode in which an optical pulse from the CrFL is output to the variable delay optical path and the highly nonlinear waveguide.

4. The light source according to claim 1, wherein a single crystal fiber is employed for an amplification medium of the CrFL.

5. The light source according claim 1, wherein the highly nonlinear waveguide is a germanium-doped silica glass dispersion shift fiber, a photonic crystal fiber, a chalcogenide fiber, or a planar optical circuit.

6. The light source according to claim 2, further comprising an optical path adjuster configured to divide an optical pulse between the one-optical path mode in which an optical pulse from the CrFL is output to the variable delay optical path, and the two-optical path mode in which an optical pulse from the CrFL is output to the variable delay optical path and the highly nonlinear waveguide.

7. The light source according to claim 2, wherein a single crystal fiber is employed for an amplification medium of the CrFL.

8. The light source according to claim 3, wherein a single crystal fiber is employed for an amplification medium of the CrFL.

9. The light source according to claim 2, wherein the highly nonlinear waveguide is a germanium-doped silica glass dispersion shift fiber, a photonic crystal fiber, a chalcogenide fiber, or a planar optical circuit.

10. The light source according to claim 3, wherein the highly nonlinear waveguide is a germanium-doped silica glass dispersion shift fiber, a photonic crystal fiber, a chalcogenide fiber, or a planar optical circuit.

11. The light source according to claim 4, wherein the highly nonlinear waveguide is a germanium-doped silica glass dispersion shift fiber, a photonic crystal fiber, a chalcogenide fiber, or a planar optical circuit.

* * * * *